United States Patent [19]

Felter et al.

[11] Patent Number: 4,895,886

[45] Date of Patent: Jan. 23, 1990

[54] STATIC DISSIPATIVE COMPOSITION

[75] Inventors: Richard E. Felter, Lancaster; Deborah L. Musser, Columbia, both of Pa.

[73] Assignee: Armstrong World Industries, Inc., Lancaster, Pa.

[21] Appl. No.: 269,056

[22] Filed: Nov. 9, 1988

[51] Int. Cl.$^4$ .............................................. C08K 3/36
[52] U.S. Cl. ..................................... 524/247; 324/913
[58] Field of Search ....................... 524/156, 247, 913

[56] References Cited

U.S. PATENT DOCUMENTS

| | | | |
|---|---|---|---|
| 4,089,997 | 5/1978 | Van Passechm et al. | 427/172 |
| 4,268,583 | 5/1981 | Hendy | 428/910 |
| 4,278,578 | 7/1981 | Carpenter | 428/423.3 |
| 4,322,331 | 3/1982 | Shay | 524/815 |
| 4,459,352 | 7/1984 | Jones et al. | 430/539 |
| 4,556,506 | 12/1985 | Friedli et al. | 523/137 |
| 4,596,668 | 6/1986 | Berbeco | 524/913 |
| 4,642,263 | 2/1987 | Culbertson | 524/331 |

Primary Examiner—Joseph L. Schofer
Assistant Examiner—Jefffrey T. Smith

[57] ABSTRACT

A surface dissipative coating is provided of polymethylmethacrylate, choline methosulfate, long chain quaternary antistat, polyglycol monoethyl ether acetone, and fumed silica. A clear aqueous coating composition replaces polymethylmethacrylate with polyurethane. Surface resistivities of $10^6$–$10^7$ are obtained.

9 Claims, No Drawings

STATIC DISSIPATIVE COMPOSITION

FIELD OF THE INVENTION

The invention relates to coatings which dissipate static. More particularly, the invention relates to a static dissipative composition which can be coated on a vinyl surface.

BACKGROUND OF THE INVENTION

Antistatic and/or static dissipative coatings are known from U.S. Pat. Nos. 4,089,997; 4,278,578; 4,322,331; 4,459,352; 4,556,506; 4,596,668; and 4,642,263. Effective agents described in these patents include: polystyrene sulphonic acid, co(ethylene/-maleic acid) sodium salt, aliphatic polycarboxylic acid, potassium cellulose succinate, metal flakes, n-alkyl dimethyl benzyl, quaternary ammonium chlorie, cetylpyridinium chloride, stearamidopropyl dimethyl-beta-hyroxyethyl ammonium nitrate and N,N,N,N',N'-pentamethyl-N' tallow trimethylene diammonium-bis (methyl sulfate). These agents can be formulated in a range of coating compositions which can be photopolymerized or crosslinked to provide permanent antistatic protection. Static dissipative materials typically have resistivities in the range of $10^6$ to $10^{11}$ ohm/square.

Despite what is known in the art, a need still exists for a static dissipative (antistatic) composition which can be applied as a liquid or aerosol spray to produce clear or pigmented permanent coatings on vinyl plastic.

SUMMARY OF THE INVENTION

A static dissipative coating composition comprising on a weight basis:
(1) 6 to 50 parts solvent soluble polymer binder,
(2) 1 to 20 parts choline antistat,
(3) 1 to 10 parts quaternary ammonium long chain antistat, and
(4) 4 to 90 parts solvent vehicle.

A preferred composition for aerosol spray application comprises in parts by weight:

| | |
|---|---|
| Polymethylmethacrylate | 13 |
| Toluol | 18 |
| Methyl ethyl ketone | 30 |
| Methyl isobutyl ketone | 8 |
| Isopropyl alcohol | 14 |
| Propylene glycol methyl ether acetate | 5 |
| Fumed silica | 1.2 |
| TiO$_2$ | 3 |
| Ethyl bis(polyethoxyethanol) alkyl ammonium ethyl sulphate | 1 |
| Dimethyl-ethyl ammonium ethosulphate | 1 |
| Choline methosulphate | 1.2 |
| Pigment dispersant | .01 |

A 2 mil pigmented coating on a vinyl substrate provides a surface resistivity of $10^7$ ohm/sq. at 50% RH.

A method for preparing a coating or spray antistatic composition comprising the steps:
(a) dissolving a choline antistat and one or more long chain quaternary ammonium antistats in an alcohol,
(b) dissolving a polymer binder in organic solvent,
(c) blending an inorganic particulate into (b) to homogeneous consistency, and
(d) adding (a) to (b) with constant stirring to produce a storage stable composition.

DETAILED DESCRIPTION OF THE INVENTION

It has been discovered that a combination of polymer binder, coalescence agent and two or more anti-static agents provides a clear and hard surface coating. Choline methosulphate does not "sweat out" from the coating at high relative humidity when combined with at least one long chain quaternary antistat.

It was unexpected to find that two antistat agents provided synergism with a third antistat agent to provide superior electrical and physical properties than would otherwise be possible. A hygroscopic antistat "diluted" with antistats with inadequate electrical conductance behaves as if it had not been diluted at all. The composition has superior physical properties and appearance when coated on a vinyl surface, especially at high relative humidity (RH).

Choline methosulphate is a crystalline solid which melts below 150° F. with the structure:

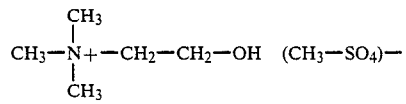

Other similar antistats which could be substituted for choline methosulphate include:

Choline hydroxide        Choline chloride

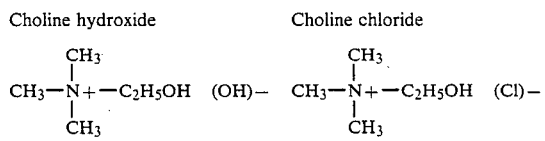

as well as 2,3-epoxy propyl trimethylammonium chloride, 3-chloro-2-hydroxy propyl trimethyl ammonium chloride, and 3-trimethyl ammonium-1-propanol methyl sulphate.

Quaternary ammonium salt antistats with higher molecular weight and at least one long chain include cocotrimethyl ammoniun chloride, ethyl bis(polyethoxy ethanol) alkyl ammonium ethyl sulphate and fatty acid modified dimethyl-ethyl ammonium ethosulphate.

For a solvent composition, it is preferred to use a binder of polymethylmethacrylate (PMMA). Other polymer binders may be used alone or in combination with PMMA such as: polyurethane, polyester, epoxy, melamine, vinyl, and vinyl copolymer resins. Polyurethane provides an excellent binder for an aqueous coating composition.

While other similar organic solvents can be employed, it is preferred to use isopropyl alcohol to dissolve the antistatic agents and a combination of toluol, methyl ethyl ketone and methyl isobutyl ketone to dissolve the polymer binder.

A coalescing agent such as propylene glycol methyl ether acetate (PGMEA) provides good film forming properties in the composition of the invention. Other agents include pyrol and cellosolve acetate.

Inorganic particulates such as fumed silica, TiO$_2$, ZnO, and Al$_2$O$_3$ serve to stabilize the composition by preventing phase separation of antistatic agents. A preferred particulate is fumed silica commercially available as Aerosil ® 200 from Degussa. Fumed silicas are capable of forming a chain structure in the binder.

While the composition can be clear and transparent, it is also possible to add colored pigment. Color variations are possible using pigments such as carbon black, iron oxide, and organic pigments. For electrical performance and permanency, a $TiO_2$ pigmented composition is preferred.

A pigment dispersant may also be added when the composition is pigmented rather than clear or translucent. A preferred dispersant is Nuosperse ® 657 from Nuodex Inc., a HULs Company, Piscataway, NJ.

The composition may also contain other ingredients such as crosslinkers, thickeners, and defoamers. carbodiimide is a preferred crosslinker. It should be obvious that spray compositions will differ from roll, dip, or painting coating compositions.

The homogeneous composition of the invention can be conveniently packaged in an aerosol can to produce a fine spray. Useful propellants inclue fluorocarbons, hydrocarbons, $CO_2$, NO, etc. It is preferred to use Dymel ® 22 from DuPont, a non-photochemically active fluorocarbon. By applying a uniform spray, it is possible to produce a continuous 1 to 2 mil film on a surface to be protected such as for electrostatic decay (ESD) applications. Packaged in aerosol form, the composition of the invention provides superior ESD and coating uniformity compared to existing aerosol products such as Miller-Stephenson MS-482 which propells aluminum powder onto the surface to be protected, and cannot therefore provide a clear or translucent coating.

For the composition of the invention to work most efficiently for electrical conductivity, it is usually necessary to maintain the combination of antistat agents at 15 to 25% by weight along with from 3 to 6% fumed silica. For static dissipation, the combination of antistat agents should be 5 to 15% by weight. Thus, to be effective in the present invention, the combined weight of antistat agents should be about 10 to about 15% along with 3 to 6% by weight fumed silica based on the total weight of solids.

These compositions have industrial applicability for ESD facilities and processes where sensitive electronic components can be damaged by even small static discharge.

Surface resistivities were tested according to ASTM D-257 using an Electrotech Systems Inc. Resistivity Probe (Model 802) "IKE PROBE". An 11-lb. weight applied force to the probe in all measurements. A Dr. Theidig Milli-To 2 wide range resistance meter was connected to the probe for direct digital readout of resistance. The tests conducted at 50% RH were set up in a room controlled at 50±1% RH and 23±1° C. temperature. The tests conducted at 15% RH were set up in a dry box controlled at 14±2% RH and 23±1° C. temperature.

The following examples illustrate the practice of the invention without being exhaustive. Example 1 represents the best mode.

EXAMPLE 1

A. Solution

An isopropyl alcohol solution was prepared by mixing together in parts by weight:

| | |
|---|---|
| Ethyl bis(polyethoxyethanol) alkyl ammonium ethyl sulphate (Varstat ® 66 from Sherex Chemical Corp. | 1 |
| Fatty acid modified dimethyl-ethyl ammonium ethosulphate (Larostat ® 264A from Mazer Chemicals) | |
| Choline methosulfate | 1.2 |
| Isopropanol | 14 |

B. Solution

A polymer binder solution was prepared by mixing together in parts by weight:

| | |
|---|---|
| PMMA from Rohm and Haas Co. | 13 |
| Toluol | 18 |
| Methyl ethyl ketone (MEK) | 30 |
| Methyl isobutyl ketone (MIBK) | 8 |
| Propylene glycol methyl ether acetate (PGMEA) | 5 |
| Nuosperse ® 657 from Nuodex Inc | .01 |

With constant stirring, 1.2 parts of fumed silica (Aerosil ® 200 from Degussa Corp.) were added to 25% of the B solution. Then 20% more of B solution was added and 3.0 parts of $TiO_2$ (Mobay Chemicals) were blended into the dispersion. The remainder of B was then added. Maintaining constant stirring, Solution A was blended into Solution B to prepare the coating composition.

An additional 13 parts of acetone was added and the composition was placed in a 16 oz. aerosol can which contained a fluorocarbon propellant.

The composition was sprayed onto a polyvinyl chloride surface to produce a uniform film of 2 mils thickness. When dry the opaque white samples were conditioned and tested.

A comparison test was performed with a 16 oz. can of Miller-Stephenson MS-482 to produce opaque grey samples.

Table 1 contains comparative results.

TABLE 1

| Sample | Invention | Comparison |
|---|---|---|
| Surface Resistivity 50% RH | $1 \times 10^7$ | $>10^{13}$ |
| Surface Resistivity 15% RH | $1 \times 10^8$ | $>10^{13}$ |
| Appearance | White | Grey |

As shown, the invention produces a surface dissipative coating with superior electrical properties as well as more pleasing uniform and permanent white coating.

COMPARATIVE EXAMPLE 2

Compositions A, B, and C were prepared as in Example 1 except that only one antistat was used in each formulation. A contained only ethyl bis(polyethoxyethanol) alkyl ammonium ethyl sulphate. B contained only fatty acid modified dimethyl-ethyl ammonium ethosulphate. C contained only choline methosulphate. Samples were spray coated on polyvinyl chloride, conditioned and tested as in Example 1. Table 2 gives results in which all formulations contain 3.2 parts by weight antistat.

TABLE 2

| Sample | Example 1 | A | B | C |
|---|---|---|---|---|
| Surface Resis. 50% RH | $1 \times 10^7$ | $5 \times 10^9$ | $1 \times 10^9$ | $5 \times 10^6$ |
| Surface Resist. 15% RH | $1 \times 10^8$ | $1 \times 10^{11}$ | $1 \times 10^{10}$ | $1 \times 10^8$ |
| Hygroscopic | NO | NO | NO | YES |
| Permanent | YES | YES | YES | NO |

TABLE 2-continued

| Sample | Example 1 | A | B | C |
|---|---|---|---|---|
| Uniform | YES | YES | YES | NO |
| Survive Damp Wipe | YES | YES | YES | NO |

Thus, while the electrical conductance of C would be satisfactory for ESD applications, the physical properties are inadequate. A and B have adequate physical properties but poor electrical conductance. Surprisingly, the combination in Example 1 gives better overall properties.

EXAMPLE 3

A composition was prepared as in Example 1 except that fumed silica (Aerosil ® 200) was omitted from the formulation. The resulting composition was not completely homogeneous on standing as was the composition of Example 1. When tested as in Example 1, the surface resistivity was $1 \times 10^9$ (50% RH) and $1 \times 10^{10}$ (15% RH) showing that the inorganic particulate plays an important role in providing good electrical properties.

EXAMPLE 4

A low surface gloss aqueous spray composition was prepared by combining the following in parts by weight:

| | |
|---|---|
| Urethane W-240 from Whitco Chemical Co. (30% solids) | 100 |
| M-pyrol | 2 |
| Choline methosulphate | 5 |
| Ethyl bis(polyethoxyethanol) alkyl ammonium ethyl sulphate (Varstat ® 66 from Sherex Chemical Corp.) | 0.5 |
| Fatty acid modified diemthyl-ethyl ammonium ethosulphate (Larostat ® 264A from Mazer Chemicals) | 0.5 |
| Coco trimethyl ammonium chloride (Adogen ® 461 from Sherex Chemical Corp.) | |
| Fluorocarbon surfactant 5% solution (Fluorad ™ FC-129 from 3M) | 1 |
| Aqueous emulsion silicone defoamer (SWS-211 from Morton Thiokol) | |
| Water soluble polymer thickener 20% solution (UCAR SCT-270 from Union Carbide) | 1.5 |
| Carbodiimide crosslinker (UCAR LNK XL-25 SE from Union Carbide) | 4 |
| Aerosil ® 200 fumed silica | 1 |
| Water | 20 |

The composition was spray coated after formulation and then one week later after dilution with 75 g water. The clear coatings were 2 mils thick and gave surface resistivities of $1 \times 10^7$ ohm/sq.

EXAMPLE 5

A composition was prepared as in Example 4 except that Aerosil ® 200 (fumed silica) was omitted in order to increase surface gloss. As with Example 4, the composition was sprayed fresh and one week later with dilution. Table 3 contains results.

TABLE 3

| Coating | Thickness, Mils | Surface Resistivity (50% RH) |
|---|---|---|
| Fresh | 7.5 | $3.5 \times 10^7$ |
| One Week | 5 | $9.1 \times 10^6$ |

EXAMPLE 6

The solvent composition of Example 1 and the aqueous composition of Example 4 were both coated on polyvinyl chloride surfaces and allowed to dry to provide uniform coatings. At 50% RH both coatings gave surface resistivities of $1 \times 10^7$ ohm/sq indicating the compositions are effective both as spray and conventionally applied coatings.

What is claimed is:

1. A method for preparing a non-aqueous antistatic coating composition to provide a composition that can be packaged as an aerosol spray, the said non-aqueous coating composition comprising (1) 1-1.5 parts of a choline antistat, (2) 1.6-2.4 parts of one or more long chain quarternary ammonium antistat, (3) 70-90 parts of a solvent vehicle, (4) a polymer binder, and (5) an inorganic particulate, with the parts by weight of (1)-(5) totalling to an amount in the range of from 87.1 to 123.9; comprising the steps:
    (a) dissolving the said choline antistat and the said long chain quarternary ammonium antistat in an alcohol to form a solution, and
    (b) blending the solution formed in (a) and a mixture of an organic solvent, the said polymer binder dissolved in the organic solvent, and the said inorganic particulate, to form a storage stable composition wherein the 70-90 parts of the said solvent vehicle are provided by the alcohol and the organic solvent.

2. The method of claim 1 wherein the organic solvent is methyl ethyl ketone, methylisobutyl ketone and toluol and the alcohol is isopropanol.

3. The method of claim 1 wherein the inorganic prticulate is fumed silica.

4. The method of claim 1 wherein the inorganic particulate is fumed silica and $TiO_2$.

5. A method for preparing a non-aqueous antistatic coating composition which is an aerosol spray composition, the said non-aqueous coating composition comprising (1) 1-1.5 parts of a choline antistat, (2) 1.6-2.4 parts of one or more long chain quarternary ammonium antistat, (3) 70-90 parts of a solvent vehicle, (4) a polymer binder, and (5) an inorganic particulate, with the parts by weight of (1)-(5) totalling to an amount in the range of from 87.1 to 123.9; comprising the steps:
    (a) dissolving the said choline antistat and the said long chain quarternary ammonium antistat in an alcohol to form a solution,
    (b) blending the solution formed in (a) and a mixture of an organic solvent, the said polymer binder dissolved in the organic solvent, and the said inorganic particulate, to form a storage stable composition wherein the 70-90 parts of the said solvent vehicle are provided by the alcohol and the organic solvent, and
    (c) putting a propellant and the storage stable composition into an aerosol can to form the aerosol spray composition.

6. The method of claim 5 wherein the propellant in a non-photochemically active fluorocarbon.

7. The method of claim 5 wherein fumed silica and $TiO_2$ are used as the inorganic particulate.

8. The method of claim 5 wherein fumed silica is the inorganic particulate.

9. The method of claim 5 wherein the organic solvent is methyl ethyl ketone, methylisobutyl ketone and toluol and the alcohol is isopropanol.

* * * * *

UNITED STATES PATENT AND TRADEMARK OFFICE
CERTIFICATE OF CORRECTION

PATENT NO.   : 4,895,886
DATED        : January 23, 1990
INVENTOR(S)  : Richard E. Felter et al It is certified that error appears in the above-identified patent and that said Letters Patent is hereby corrected as shown below:

Column 5, line 39, the number "1" should be inserted in the number column; line 41, the superscript "™" should read as "®"; and line 43, the number "1" should be inserted in the number column.

Signed and Sealed this

Third Day of December, 1991

*Attest:*

HARRY F. MANBECK, JR.

*Attesting Officer*     *Commissioner of Patents and Trademarks*